United States Patent
Tomura et al.

(10) Patent No.: US 11,834,123 B2
(45) Date of Patent: Dec. 5, 2023

(54) DRIVING ASSISTANCE APPARATUS

(71) Applicant: HONDA MOTOR CO., LTD., Tokyo (JP)

(72) Inventors: Kineo Tomura, Tokyo (JP); Kyosuke Inada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 414 days.

(21) Appl. No.: 17/152,820

(22) Filed: Jan. 20, 2021

(65) Prior Publication Data

US 2021/0237827 A1    Aug. 5, 2021

(30) Foreign Application Priority Data

Feb. 3, 2020  (JP) ................. 2020-016385

(51) Int. Cl.
*B62K 25/04*    (2006.01)
*B62J 50/22*    (2020.01)

(52) U.S. Cl.
CPC ............. *B62K 25/04* (2013.01); *B62J 50/22* (2020.02); *B62K 2025/045* (2013.01)

(58) Field of Classification Search
CPC .......... B60G 2204/1242; B60G 15/063; B60G 17/0165; B60G 2300/12; B60G 2500/30; B62J 50/22; B62J 45/41; G08G 1/165; G08G 1/166; B62K 25/04; B62K 2025/045

See application file for complete search history.

(56) References Cited

U.S. PATENT DOCUMENTS

| | | | |
|---|---|---|---|
| 8,672,334 B1 | 3/2014 | Murakami et al. | |
| 9,633,565 B2 | 4/2017 | Conrad | |
| 11,021,165 B2* | 6/2021 | Noguchi | H04W 4/40 |
| 2012/0109454 A1* | 5/2012 | Fischer | G08G 1/167 |
| | | | 701/36 |
| 2019/0032746 A1* | 1/2019 | Tomura | F16F 9/56 |
| 2019/0225297 A1* | 7/2019 | Mochizuki | F16F 9/46 |
| 2019/0270358 A1* | 9/2019 | Korrect | B60G 17/018 |
| 2019/0329793 A1* | 10/2019 | Schwabe | B60W 40/112 |

(Continued)

FOREIGN PATENT DOCUMENTS

| | | |
|---|---|---|
| DE | 102013102588 | 3/2014 |
| DE | 102013222880 | 5/2014 |
| DE | 102016225497 | 6/2018 |

(Continued)

OTHER PUBLICATIONS

Japanese Office Action for Japanese Patent Application No. 2020-016385 dated Oct. 12, 2021.

(Continued)

*Primary Examiner* — Mussa A Shaawat
(74) *Attorney, Agent, or Firm* — AMIN, TUROCY & WATSON, LLP (57) ABSTRACT

A driving assistance apparatus according to an embodiment includes a vehicle height adjusting mechanism that adjusts vehicle height of a vehicle; a progress parameter acquiring unit that acquires a progress parameter expressing a degree of progression until the vehicle reaches a target object in front of the vehicle; and a control section that controls the vehicle height adjusting mechanism based on the progress parameter.

6 Claims, 5 Drawing Sheets

(56) References Cited

U.S. PATENT DOCUMENTS

2022/0179092 A1* 6/2022 Beuschel ............... G01S 17/931
2022/0204122 A1* 6/2022 Tokuhara ............... B62K 25/04

FOREIGN PATENT DOCUMENTS

| JP | 11-170838 | 6/1999 | | |
| JP | 2016-107834 | 6/2016 | | |
| JP | 2018-043569 | 3/2018 | | |
| KR | 20160104344 A * | 9/2016 | ............... | B62J 1/06 |
| KR | 1020160104344 | 9/2016 | | |

OTHER PUBLICATIONS

German Office Action and Search Report for German Patent Application No. 102021101620.7 dated Feb. 18, 2022.

* cited by examiner

DRIVING ASSISTANCE APPARATUS

CROSS-REFERENCE TO RELATED APPLICATION

This application is based upon and claims the benefit of priority from Japanese Patent Application No. 2020-016385 filed on Feb. 3, 2020, the contents of which are incorporated herein by reference.

BACKGROUND OF THE INVENTION

Field of the Invention

The present invention relates to a driving assistance apparatus that assists with driving of a vehicle.

Description of the Related Art

Driving assistance apparatuses that assist with the driving of vehicles are being developed. For example, Japanese Laid-Open Patent Publication No. 2018-043569 discloses a driving assistance apparatus that, when the driver is judged to be in an abnormal state, inclines the vehicle body to the rear and moves the driver away from the driving manipulation.

SUMMARY OF THE INVENTION

However, the invention of Japanese Laid-Open Patent Publication No. 2018-043569 has difficulty assisting with the handling of obstacles. It is an objective of the present invention to provide a driving assistance apparatus that assists with the handling of obstacles.

A driving assistance apparatus according to one aspect comprises a vehicle height adjusting mechanism configured to adjust vehicle height of a vehicle; a progress parameter acquiring unit configured to acquire a progress parameter expressing a degree of progression until the vehicle reaches a target object in front of the vehicle; and a control section configured to control the vehicle height adjusting mechanism based on the progress parameter.

According to the present invention, it is possible to provide a driving assistance apparatus that assists with the handling of obstacles.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
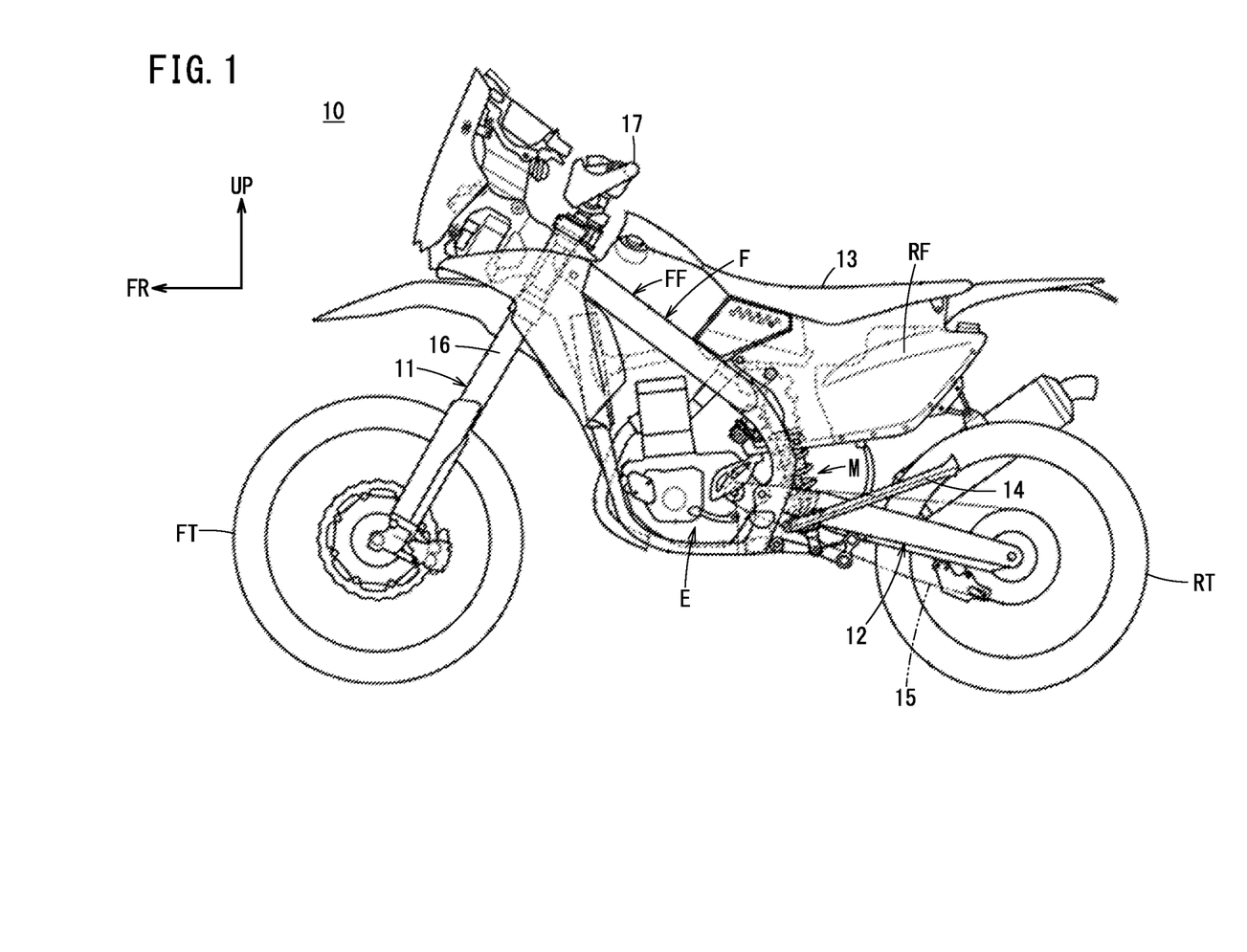
FIG. 1 is a left-side view of a motorcycle according to an embodiment.

The following describes a driving assistance apparatus according to an embodiment, with reference to the accompanying drawings. FIG. 1 is a left-side view of a motorcycle 10 according to an embodiment. In FIG. 1, among components that form left-right pairs, only the left-side components are shown, and the right-side components are not shown in the drawings. In the drawings, "FR" represents forward and "UP" represents upward.

The motorcycle 10 is a saddle-type vehicle in which the driver sits in a straddling manner, and includes a vehicle frame F (front frame FF and rear frame RF), an engine E, a steering system 11, a swinging arm 12, a seat 13, and a side stand 14.

The engine E is supported by the vehicle frame F, and drives a rear wheel RT. The output of the engine E is transmitted to the rear wheel RT by a chain 15.

The steering system 11 is arranged at a front end of the front frame FF, and includes a pair of front forks 16 and a handle 17. The handle 17 is arranged at the top ends of the front forks 16, and a front wheel FT is arranged at the bottom ends of the front forks 16.

The swinging arm 12 is arranged on a rear side of the vehicle frame F, and supports the rear wheel RT. The seat 13 is arranged on a top portion of the rear frame RF, and is sat on by the driver.

A suspension mechanism M, which attenuates swinging of the swinging arm 12, is arranged between the swinging arm 12 and the vehicle frame F. The suspension mechanism M extends and contracts in an axial direction in accordance with up-down swinging of the swinging arm 12, to absorb impacts from the road surface.

Figure 2:
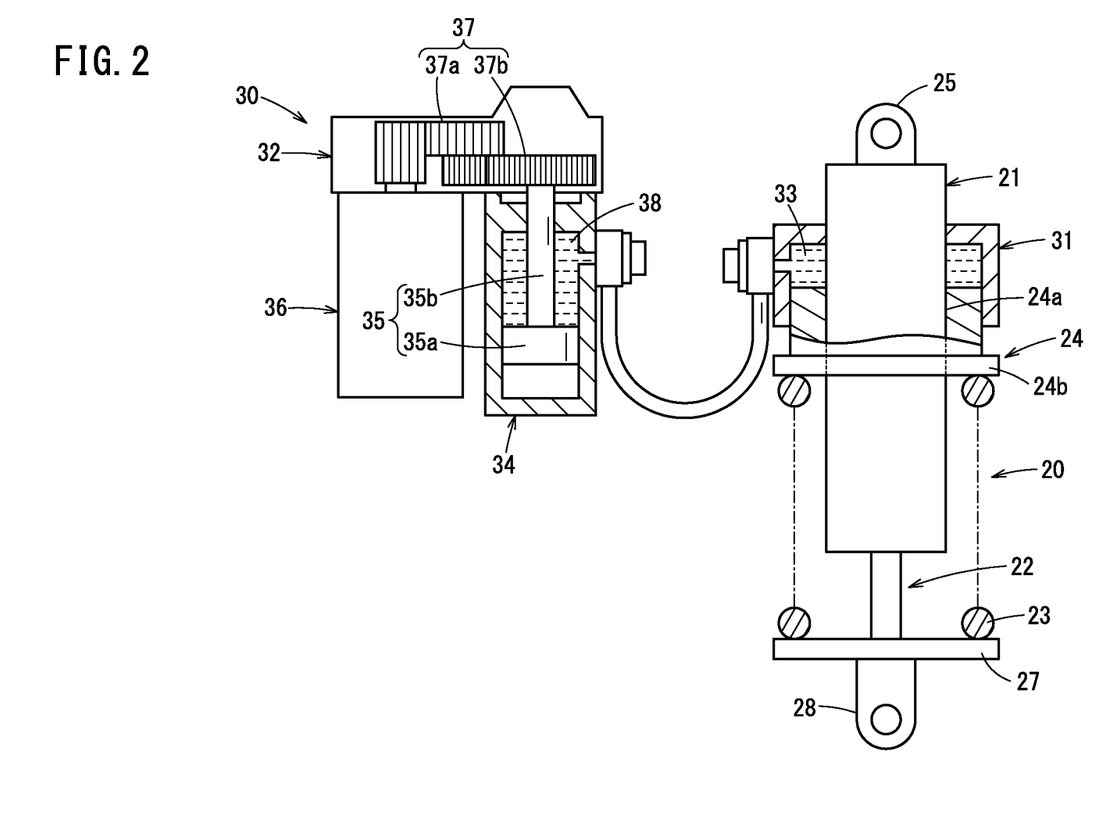
FIG. 2 is a diagram showing details of a suspension mechanism.

FIG. 2 is a diagram showing the details of the suspension mechanism M. As shown in FIG. 2, the suspension mechanism M includes a suspension 20 and a vehicle height adjusting mechanism 30.

The suspension 20 includes a suspension cylinder 21, a piston member 22, and a coil spring 23. The suspension cylinder 21 includes a cylinder-side receiving member 24 (cylindrical portion 24a and spring receiving portion 24b) and a body-side connecting portion 25. The piston member 22 includes a piston-side receiving member 27 and a wheel-side connecting portion 28.

The body-side connecting portion 25 of the suspension cylinder 21 is connected to the front frame FF, and the wheel-side connecting portion 28 of the piston member 22 is connected to the swinging arm 12. The inside of the suspension cylinder 21 is filled with hydraulic oil, and the piston member 22 is capable of sliding up and down.

The coil spring 23 is arranged in a compressed state between the spring receiving portion 24b of the cylinder-side receiving member 24 and the piston-side receiving member 27 of the piston member 22, and biases the piston member 22 in the extension and contraction direction of the suspension 20.

The cylinder-side receiving member 24 is capable of moving up and down relative to the suspension cylinder 21. That is, the cylindrical portion 24a of the cylinder-side receiving member 24 slidably engages with the outer circumference of the suspension cylinder 21. As shown below, the cylinder-side receiving member 24 is pressed by the vehicle height adjusting mechanism 30 (particularly a jack member 31) to move up and down.

The vehicle height adjusting mechanism 30 is used to adjust the vehicle height and the initial load of the suspension 20, and includes the jack member 31 and a hydraulic pressure generating unit 32.

The jack member 31 presses the cylinder-side receiving member 24 using hydraulic pressure (meaning hydraulic pressure in which the medium is not limited to oil). The jack member 31 has a bottomed cylinder shape, and is fixed to the suspension cylinder 21. An oil chamber 33 is formed around the jack member 31 and the suspension cylinder 21.

The hydraulic pressure generating unit 32 includes a cylinder 34, a piston 35 (piston body 35*a* and shaft portion 35*b*), a motor 36 (actuator and electric motor), a transmission mechanism 37 (gears 37*a* and 37*b*), and a hydraulic chamber 38.

The piston body 35*a* is capable of moving and rotating along the shaft of the cylinder 34, and is connected to the transmission mechanism 37 via the shaft portion 35*b*. A male screw, which is screwed into a through-hole (female screw) of the gear 37*b*, is formed in the outer circumference of the shaft portion 35*b*.

The rotation of the motor 36 is converted into linear motion via the transmission mechanism 37, and causes the piston 35 to move up and down. The gear 37*a* is rotated by the motor 36, and the gear 37*b* is also rotated by the motor 36. When the gear 37*b* rotates, the shaft portion 35*b* (piston 35) engaged with the gear 37*b* moves in the axial direction of the cylinder 34.

By driving the piston 35 with the rotation of the motor 36, the vehicle height adjusting mechanism 30 changes the hydraulic pressure in the oil chamber 33 of the jack member 31, thereby adjusting the initial load applied to the suspension 20. Due to forward and reverse rotation of the motor 36, the piston 35 raises and lowers and oil is supplied to the oil chamber 33 from the hydraulic chamber 38 and discharged from the oil chamber 33, such that the amount of oil within the oil chamber 33 increases and decreases, thereby changing the vehicle height H (height of the seat 13 relative to the road surface). It should be noted that the increase and decrease of the amount of oil within the oil chamber 33 means the increase and decrease of the initial load of the suspension 20. In other words, the vehicle height adjusting mechanism 30 has the function of both adjusting the vehicle height H and adjusting the initial load of the suspension 20.

When the vehicle height H is to be lowered by a height ΔH [cm], the vehicle height adjusting mechanism 30 discharges AA [cm³] of oil from the oil chamber 33.

$$\Delta A = \Delta H \cdot S \quad \text{Expression 1:}$$

S: floor surface area [cm²] of the oil chamber 33

Figure 3:
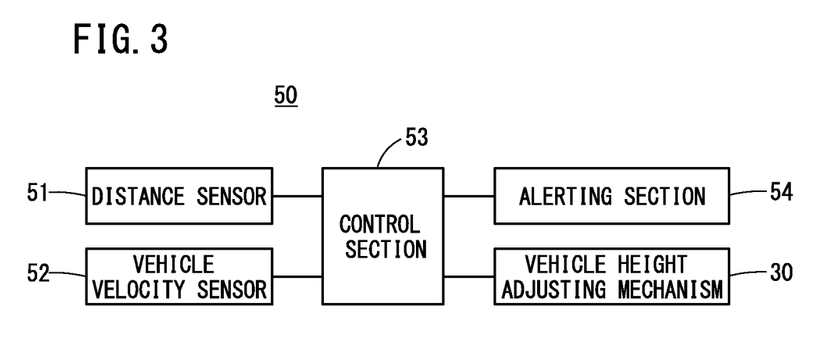
FIG. 3 is a diagram showing a configuration of a driving assistance apparatus.

FIG. 3 shows a configuration of a driving assistance apparatus 50 that assists with driving of the motorcycle 10. As shown in FIG. 3, the driving assistance apparatus 50 includes a distance sensor 51, a vehicle velocity sensor 52, a control section 53, an alerting section 54, and the vehicle height adjusting mechanism 30.

The distance sensor 51 is an ultrasonic type or an optical type, for example, and includes a transmitting section, a receiving section, and a ranging section. The transmitting section transmits an ultrasonic wave or a light pulse to the front of the motorcycle 10. The receiving section receives a pulse reflected from a target. The ranging section calculates the distance L between the motorcycle 10 and the target object (obstacle) O, based on the time from when the pulse is transmitted to when the pulse is received.

This distance L is an example of a progress parameter. Furthermore, the distance sensor 51 functions as a progress parameter acquiring unit that acquires the progress parameter.

The progress parameter indicates the degree of progress made by the motorcycle 10 until reaching the target object O, and as described below, it is possible to issue a warning, raise or lower the vehicle height H by a small amount (warning), and lower the vehicle height H by a large amount, according to the progress parameter.

The progress parameter can include, aside from the distance L, a time to reach T (corresponding to a so-called TTC: Time-To-Collision) that is described further below and a smallness of the target object as seen from the motorcycle 10. The reason that "smallness of the target object" is used instead of "largeness of the target object" is to make the parameter correspond to the distance L and time to reach T, which have smaller values as the motorcycle 10 approaches the target object, and can be calculated as described further below.

The progress parameter does not necessarily need to be a single parameter, and may be a combination of a plurality of parameters (e.g. (1) a combination of the distance L and vehicle velocity V or (2) a combination of the distance L and a relative velocity Va described further below).

The progress parameter acquiring unit includes not only a unit for detecting the progress parameter itself (here, the distance L), such as the distance sensor 51, but also a unit for calculating the progress parameter from another parameter.

For example, the time to reach T (TTC) can be calculated from the distance L to the target object O and the relative velocity Va with respect to the target object O, which are measured by the distance sensor 51 and a relative velocity sensor, as described further below. In this case, a combination of the distance sensor 51, the relative velocity sensor, and a calculating section (that calculates the time to reach T by dividing the distance L by the relative velocity Va, for example) functions as the progress parameter acquiring unit.

Furthermore, in a case where the progress parameter is the smallness of the target object O as seen from the motorcycle 10, a combination of a camera (CCD or the like), an image processing section, and a calculating section, for example, functions as the progress parameter acquiring unit. The image processing section extracts the contour of the target object O from an image captured by the camera, for example. The calculating section calculates the smallness of the target object O as being the ratio (area ratio or the like) of an image remaining after the target object O has been removed from the captured image, to the captured image, for example.

The vehicle velocity sensor 52 measures the rotational velocity of the front wheel FT or the rear wheel RT and converts this rotational velocity into a movement velocity of the motorcycle 10 (vehicle velocity), for example.

The control section 53 controls the alerting section 54 and the vehicle height adjusting mechanism 30, based on the measurement results of the distance sensor 51 and the vehicle velocity sensor 52. The control section 53 can be formed by a combination of hardware (e.g. a CPU: Central Processing Unit) and software (e.g. a program).

The control section 53 operates as shown by (1) to (3) below, based on a magnitude relationship between the distance L (which is an example of the progress parameter) detected by the distance sensor 51 and threshold values L1, L2, and L3.

(1) If the distance L detected by the distance sensor 51 is less than the threshold value L1, the control section 53 controls the vehicle height adjusting mechanism 30 to lower the vehicle height H by a height ΔH1. In this way, it is possible to improve footing before reaching.

(2) If the distance L is less than the threshold value L2 (which is greater than the threshold value L1), the control section 53 controls the vehicle height adjusting mechanism 30 to raise or lower the vehicle height H by a height ΔH2 (which is less than the height ΔH1). In this way, it is possible to warn the driver that they are approaching the target object O. It should be noted that a state in which the vehicle height H has been lowered (or raised) may be maintained, without further raising or lowering of the vehicle height H.

(3) If the distance L is less than the threshold value L3 (which is greater than the threshold values L1 and L2), the control section 53 controls the alerting section 54 to alert the driver. In this way, the driver can be alerted to the approach of the target object O.

The control section 53 causes at least one of the threshold values L1 to L3 to become smaller as the vehicle velocity V becomes greater. In this way, it is possible to switch among lowering the vehicle height by the height ΔH1, raising or lowering the vehicle height by the height ΔH2 (warning), and alerting the driver, at suitable distances L corresponding to the vehicle velocity V (see FIG. 5 described further below).

At least one of the threshold values L1 to L3 may be made smaller as the relative velocity Va measured by the relative velocity sensor described further below, instead of the vehicle velocity V, becomes greater. Alternatively, the threshold values L1 to L3 may be fixed values.

The alerting section 54 is an audio output section (e.g. a speaker), and alerts the driver (provides a warning message) using sound, for example. The alerting section 54 may include a light emitting section (e.g. an LED: Light Emitting Diode), and alert the driver using a display (such as light) instead of or in addition to the sound.

The vehicle height adjusting mechanism 30 is controlled by the control section 53 to adjust the vehicle height H (height of the seat 13 relative to the road surface) by supplying oil to or discharging oil from the oil chamber 33.

Figure 4:
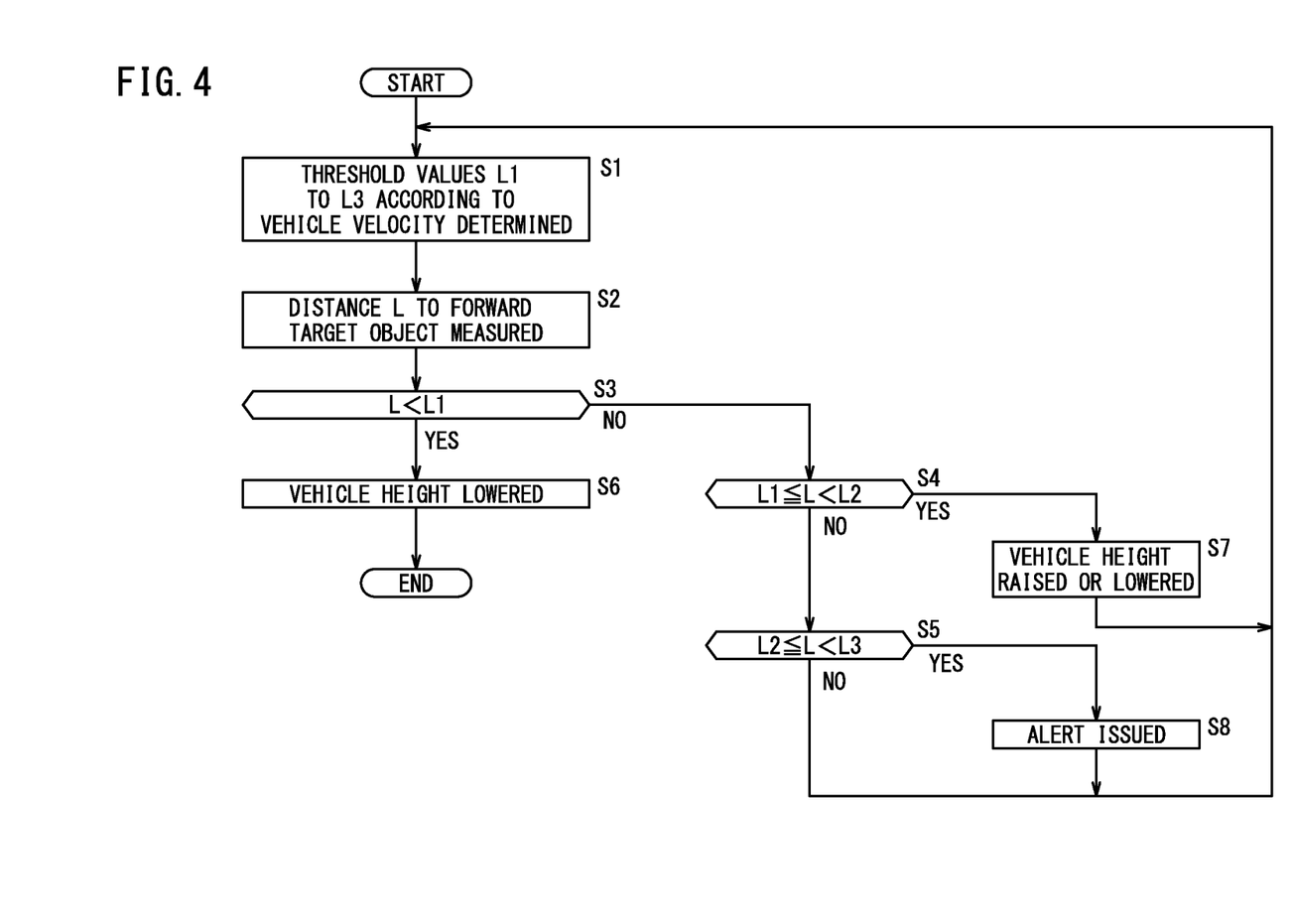
FIG. 4 is a flow chart showing an example of an operational procedure of the driving assistance apparatus.

FIG. 4 is a flow chart showing an example of an operational procedure of the driving assistance apparatus 50. The following describes the details of the operation of the driving assistance apparatus 50, based on FIG. 4.

The control section 53 determines the threshold values L1, L2, and L3 according to the vehicle velocity V, while the motorcycle 10 is travelling (step S1).

Figure 5:
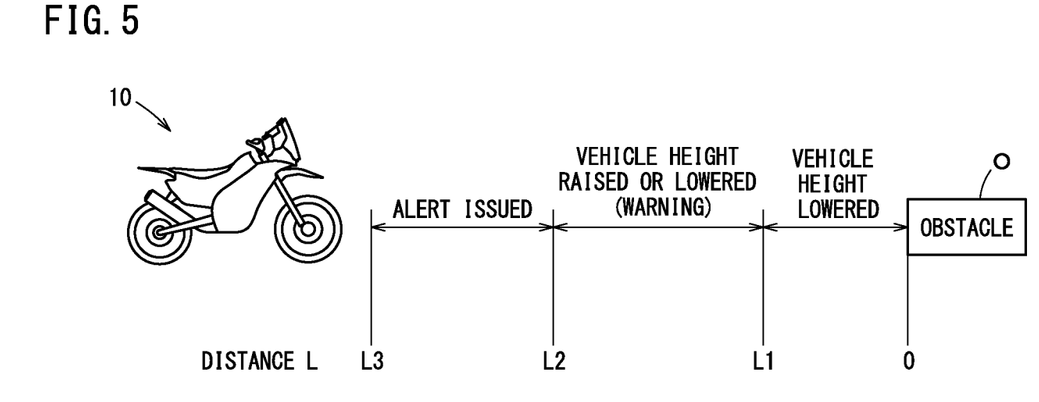
FIG. 5 is a diagram showing an example of a correspondence between distance to a target object (obstacle) and operation of the driving assistance apparatus.

The threshold values L1, L2, and L3 are values that are compared to the distance L to the target object O, become larger in the stated order (L1<L2<L3), and correspond respectively to lowering the vehicle height by the height ΔH1 (improving footing), raising or lowering the vehicle height by the height ΔH2 (warning), and alerting the driver (see FIG. 5).

The control section 53 can determine the threshold values L1, L2, and L3 (Li, where i=1, 2, 3) in the following manner, for example.

The control section 53 determines in advance a reference threshold value Lis corresponding to a reference vehicle velocity Vs, and calculates the threshold value Li from the vehicle velocity V using the following Expression 2, for example.

$$Li = (Lis/Vs) \cdot V \qquad \text{Expression 2:}$$

In this way, by making the threshold value Li greater as the vehicle velocity V becomes greater, it is possible to improve the safety during high-speed driving. However, it is not necessary to change all of the threshold values L1 to L3 according to the vehicle velocity V. Just some of the threshold values L1 to L3 may be changed according to the vehicle velocity V. Furthermore, it is possible to set all of the threshold values L1 to L3 to be fixed values.

Here, the threshold value Li is increased in proportion to the vehicle velocity V, but as long as the threshold value Li becomes greater as the vehicle velocity V becomes greater, another suitable relationship may be used. For example, the threshold value Li may be proportional to the square of the vehicle velocity V.

Here, the threshold value Li is obtained from the vehicle velocity V, but the threshold value Li may instead be calculated using the relative velocity Va measured by the relative velocity sensor described further below.

The control section 53 controls the vehicle velocity sensor 52 to measure the distance L to the target object (obstacle) O, which is in front of the motorcycle 10, and compares this distance L to the threshold value Li (steps S2 to S5).

If the distance L is less than the threshold value L1 ("L<L1", step S3), the control section 53 controls the vehicle height adjusting mechanism 30 to lower the vehicle height H by the height ΔH1 (step S6). At this time, the vehicle height adjusting mechanism 30 discharges an amount ΔA1 (=ΔH1·S) of oil from the oil chamber 33. The vehicle height adjusting mechanism 30 may discharge all of the oil from the oil chamber 33.

As a result, when the target object O approaches but is not yet reached, the vehicle height H is lowered and the driver's feet can reach the road surface when the motorcycle 10 reaches the target object O, thereby making it easier to deal with the situation when reaching (improving the footing when reaching).

If the distance L is greater than or equal to the threshold value L1 and less than the threshold value L2 ("L1≤L<L2", step S4), the control section 53 controls the vehicle height adjusting mechanism 30 to raise or lower the vehicle height H by the height ΔH2 (step S7). In this case, the vehicle height adjusting mechanism 30 discharges or supplies an amount ΔA2 of oil (=ΔH2·S) from or into the oil chamber 33. In this way, when the target object O approaches, it is possible to warn the driver by raising or lowering the vehicle height H. After the oil has been discharged from (or supplied to) the oil chamber 33, the lowered (or raised) vehicle height H may be maintained without again supplying (or discharging) oil.

The height ΔH2 is less than the height ΔH1. The height ΔH1 is a substantial vehicle height decrease for improving the footing. In contrast to this, the height ΔH2 is for warning the driver, and does not need to be a substantial vehicle height decrease that affects the footing.

If the distance L is greater than or equal to the threshold value L2 and less than the threshold value L3 ("L2≤L<L3", step S5), the control section 53 controls the alerting section 54 to alert the driver with sound and/or light (step S8). In this way, when the target object O has become close, it is possible to alert the driver using sound and/or light.

As shown in FIG. 5, the control section 53 operates in stages in the manner described below, as the distance L to the target object O becomes shorter. Specifically, if the distance L to the target object O is greater than or equal to the threshold value L3, the control section 53 does not perform any particular process (lowering the vehicle height, alerting the driver, and the like). When the distance L becomes less than the threshold value L3, the control section 53 controls the alerting section 54 to alert the driver. When the distance L becomes less than the threshold value L2, the control section 53 controls the vehicle height adjusting mechanism 30 to raise or lower the vehicle height H by the height ΔH2, to warn the driver. When the distance L becomes less than the threshold value L1, the control section 53 controls the vehicle height adjusting mechanism 30 to lower the vehicle height H by the height ΔH1, to improve the footing when reaching.

In this way, as the distance L becomes shorter, the driver is alerted, the vehicle height H is raised or lowered by a small amount (warning), and the vehicle height H is lowered by a large amount, in the stated order, thereby avoiding reaching the target object O and making it easier to deal with the situation when reaching.

(Modifications)

In the above embodiment, the control section 53 controls the vehicle height adjusting mechanism 30 based on the distance L. In contrast to this, the control section 53 may control the vehicle height adjusting mechanism 30 based on the time to reach T. The following describes such a modification.

Here, the relative velocity sensor is used instead of the vehicle velocity sensor 52. The relative velocity sensor measures the velocity relative to the target object O, using waves such as radio waves (e.g. millimeter waves) or sound waves (e.g. ultrasonic waves), and includes a transmitting section, a receiving section, and a velocity calculating section. The transmitting section transmits the radio waves or the like to the front of the motorcycle 10. The receiving section receives the waves that have been transmitted and reflected from the target object O. The velocity calculating section calculates the relative velocity Va between the motorcycle 10 and the target object O, based on the frequency difference between the waves during transmission and during reception.

When the waves are transmitted and/or received between objects moving relative to each other, the frequency of the waves during transmission and the frequency of the waves during reception are different (Doppler Effect). The relative velocity Va is expressed as shown in Expression 3 below.

$$Va = 2 \cdot c(\Delta f / f0) \quad \text{Expression 3:}$$

Δf: frequency difference between transmitting and receiving (f0−f1)
f0: frequency during transmission
f1: frequency during reception
c: wave (light or sound) velocity The operational procedure in this case does not substantially differ from the procedure shown in FIG. 4, and the following describes mainly points that differ from FIG. 4.

In the case of operation based on the time to reach T, step S1 of FIG. 4 can be omitted. That is, it is possible to use the threshold values T1 to T3 (Ti, where i=1 to 3), which do not depend on the vehicle velocity V, instead of the threshold value Li that changes according to the vehicle velocity V.

At step S2, the time to reach T until reaching the target object O is estimated, instead of measuring the distance L to the target object (obstacle) O. The time to reach T refers to the time that passes until the motorcycle 10 reaches the target object (obstacle) O, if the current state continues.

The control section 53 calculates the time to reach T (so-called TTC: Time-To-Collision), from the distance L to the target object O and the relative velocity Va measured by the distance sensor 51 and the relative velocity sensor, as described below, for example.

$$T = L/Va \quad \text{Expression 4:}$$

The time to reach T may be estimated (calculated) using the vehicle velocity V measured by the vehicle velocity sensor 52, instead of the relative velocity Va. That is, the control section 53 functions as an estimating section that estimates the time to reach T until the vehicle (motorcycle 10) reaches the target object O, based on the distance L and the relative velocity Va (or vehicle velocity V).

The control section 53 operates as shown by (1) to (3) below, based on the magnitude relationship between the time to reach T (an example of the progress parameter) and threshold values T1 to T3.

(1) If the time to reach T is less than the threshold value T1 ("T<T1", step S3), the control section 53 controls the vehicle height adjusting mechanism 30 to lower the vehicle height H by the height ΔH1 (step S6). In this way, it is possible to improve the footing before reaching.

(2) If the time to reach T is less than the threshold value T2 (which is greater than the threshold value T1) ("T1≤T<T2", step S4), the control section 53 controls the vehicle height adjusting mechanism 30 to raise or lower the vehicle height H by the height ΔH2 (step S7). In this way, it is possible to warn the driver about the approach of the target object O.

(3) If the time to reach T is greater than or equal to the threshold value T2 and less than the threshold value T3 ("T2≤T<T3", step S5), the control section 53 controls the alerting section 54 to alert the driver using sound and/or light (step S8). In this way, it is possible to alert the driver about the approach of the target object O.

In this way, as the time to reach T becomes shorter, the driver is alerted, the vehicle height H is raised or lowered by a small amount (warning), and the vehicle height H is lowered by a large amount, in the stated order, thereby avoiding reaching the target object O and making it easier to deal with the situation when reaching (in FIG. 5, the distance L is changed to the time to reach T and the threshold value Li is changed to the threshold value Ti).

In the above description, the distance L and the time to reach T are used as the progress parameter, but other parameters, such as "smallness of the target object O as seen from the motorcycle 10", or a plurality of parameters, for example, may be used. Whichever is used, it is possible to alert the driver, raise or lower the vehicle height H by a small amount (warning), and lower the vehicle height H by a large amount, according to the progress parameter.

Inventions such as described below can be understood from a collection of the embodiment and modifications described above.

[1] A driving assistance apparatus (50) according to one aspect comprises a vehicle height adjusting mechanism (30) that adjusts vehicle height (H) of a vehicle (vehicle (10)); a progress parameter acquiring unit (51) that acquires a progress parameter expressing a degree of progression until the vehicle (10) reaches a target object (O) in front of the vehicle (10); and a control section (53) that controls the vehicle height adjusting mechanism (30) based on the progress parameter. In this way, by adjusting the vehicle height (H) according to the progress parameter, it becomes easy to take measures before reaching the target object (O) in front of the vehicle (10).

[2] The progress parameter acquiring unit (51) includes a distance sensor (51) that measures a distance (L) to the target object (O) in front of the vehicle (10), and the progress parameter is the distance (L). In this way, the distance (L) is used as the progress parameter, and it becomes easy to take measures before reaching the target object (O) in front of the vehicle (10).

[3] The progress parameter acquiring unit (51) includes a distance sensor (51) that measures a distance (L) to the target object (O) in front of the vehicle (10) and a vehicle velocity sensor (52) that measures vehicle velocity (V) of the vehicle (10) or a relative velocity sensor that measures relative velocity (Va) with respect to the target object (O), and the progress parameter is a combination of the distance (L), and the vehicle velocity (V) or the relative velocity (Va).

In this way, by adjusting the vehicle height (H) using a combination of the distance (L), and the vehicle velocity (V) or the relative velocity (Va), it becomes even easier to take measures before reaching the target object (O) in front of the vehicle (10).

[4] The progress parameter acquiring unit (51) includes an estimating section that estimates a time to reach (T) until the vehicle (10) reaches the target object (O), based on the distance (L), and the vehicle velocity (V) or the relative velocity (Va), and the progress parameter is the time to reach (T). In this way, by adjusting the vehicle height H based on the time to reach T, it becomes even easier to take measures before reaching the target object (O) in front of the vehicle (10).

[5] If the progress parameter (e.g. the distance (L) or the time to reach (T)) is less than a first threshold value (L1, T1), the control section (53) controls the vehicle height adjusting mechanism (30) to lower the vehicle height (H) by a first height (ΔH1). In this way, the vehicle height (H) is lowered by the first height before reaching, and it is therefore possible to improve the footing when reaching the target object (O).

[6] If the progress parameter is greater than the first threshold value (L1, T1) and less than a second threshold value (L2, T2), the control section (53) controls the vehicle height adjusting mechanism (30) to raise or lower the vehicle height (H) by a second height (ΔH2) that is less than the first height (ΔH1). In this way, by raising or lowering the vehicle height (H) by the second height (ΔH2), it is possible to provide a warning about a possibility of reaching the target object (O).

[7] The driving assistance apparatus (50) further comprises an alerting section (54) that issues an alert using a display or a sound, and if the progress parameter is greater than a second threshold value (L2, T2) and less than a third threshold value (L3, T3), the control section (53) controls the alerting section (54) to issue the alert. In this way, it is possible to alert the driver when the target object (O) is approaching.

[8] The progress parameter is the distance (L) to the target object (O), and the control section (53) makes at least one of the first threshold value (L1), a second threshold value (L2), and a third threshold value (L3) of the distance (L) smaller as vehicle velocity (V) of the vehicle (10) or relative velocity (Va) with respect to the target object (O) becomes greater. In this way, by making at least one of the first, second, and third threshold values (L1, L2, L3) of the distance (L) smaller as the vehicle velocity (V) or the relative velocity (Va) becomes greater, it is possible to set the first, second, and third threshold values (L1, L2, L3) of the distance (L) to be suitable values corresponding to the vehicle velocity (V) or the relative velocity (Va).

The driving assistance apparatus according to the present invention is not limited to the above-described embodiments, and various configurations could be adopted therein without departing from the scope of the present invention.

What is claimed is:

1. A driving assistance apparatus, comprising:
    a vehicle height adjusting mechanism configured to adjust vehicle height of a vehicle;
    a progress parameter acquiring unit configured to acquire a progress parameter expressing a degree of progression until the vehicle reaches a target object in front of the vehicle; and
    a control section configured to control the vehicle height adjusting mechanism based on the progress parameter, wherein
    if the progress parameter is less than a first threshold value, the control section controls the vehicle height adjusting mechanism to lower the vehicle height by a first height, and
    if the progress parameter is greater than the first threshold value and less than a second threshold value that is greater than the first threshold value, the control section controls the vehicle height adjusting mechanism to raise and lower the vehicle height by a second height that is less than the first height.

2. The driving assistance apparatus according to claim 1, wherein:
    the progress parameter acquiring unit includes a distance sensor configured to measure a distance to the target object in front of the vehicle, and
    the progress parameter is the distance.

3. The driving assistance apparatus according to claim 1, wherein:
    the progress parameter acquiring unit includes:
    a distance sensor configured to measure a distance to the target object in front of the vehicle; and
    a vehicle velocity sensor configured to measure vehicle velocity of the vehicle or a relative velocity sensor configured to measure relative velocity with respect to the target object, and
    the progress parameter is a combination of the distance, and the vehicle velocity or the relative velocity.

4. The driving assistance apparatus according to claim 1, further comprising:
    an alerting section configured to issue an alert using a display or a sound, wherein
    if the progress parameter is greater than the second threshold value and less than a third threshold value, the control section controls the alerting section to issue the alert.

5. The driving assistance apparatus according to claim 4, wherein:
    the progress parameter is a distance to the target object, and
    the control section makes at least one of the first threshold value, a second threshold value, and a third threshold value of the distance smaller as vehicle velocity of the vehicle or relative velocity with respect to the target object becomes greater.

6. A driving assistance apparatus, comprising:
    a vehicle height adjusting mechanism configured to adjust vehicle height of a vehicle;
    a progress parameter acquiring unit configured to acquire a progress parameter expressing a degree of progression until the vehicle reaches a target object in front of the vehicle;
    a control section configured to control the vehicle height adjusting mechanism based on the progress parameter;

a distance sensor configured to measure a distance to the target object in front of the vehicle; and a vehicle velocity sensor configured to measure vehicle velocity of the vehicle or a relative velocity sensor configured to measure relative velocity with respect to the target object, wherein the progress parameter acquiring unit includes an estimating section configured to estimate a time to reach until the vehicle reaches the target object, based on the distance, and the vehicle velocity or the relative velocity, and the progress parameter is the time to reach.

* * * * *